United States Patent [19]

Peterson

[11] Patent Number: 4,924,371
[45] Date of Patent: May 8, 1990

[54] RECTIFIER CIRCUIT PROVODING COMPRESSION OF THE DYNAMIC RANGE OF THE OUTPUT VOLTAGE

[75] Inventor: William A. Peterson, Vestal, N.Y.

[73] Assignee: General Electric Company, Binghamton, N.Y.

[21] Appl. No.: 377,670

[22] Filed: Jul. 10, 1989

[51] Int. Cl.⁵ .............................. H02M 7/217
[52] U.S. Cl. ........................ 363/89; 363/126
[58] Field of Search .............. 363/80, 81, 89, 126, 363/127, 143

[56] References Cited

U.S. PATENT DOCUMENTS

| | | |
|---|---|---|
| Re. 25,000 | 4/1959 | Michaelis . |
| 3,089,074 | 5/1963 | Vaughan . |
| 3,156,860 | 11/1964 | Paynter ................... 363/89 |
| 3,205,426 | 9/1965 | Mills . |
| 3,329,883 | 7/1967 | Frierdich . |
| 3,364,412 | 1/1968 | Sauter . |
| 3,530,358 | 9/1970 | Thompson . |
| 3,535,617 | 10/1970 | Landis . |
| 3,713,012 | 1/1973 | Johnson . |
| 3,720,868 | 3/1973 | Lee . |
| 3,932,765 | 1/1976 | Townsend ................ 363/126 |
| 4,030,017 | 6/1977 | Brown . |
| 4,110,821 | 8/1978 | Hisano et al. ............ 363/126 |
| 4,122,517 | 10/1978 | Hayashi et al. . |
| 4,183,081 | 1/1980 | Cutler et al. . |
| 4,220,911 | 9/1980 | Rosa . |
| 4,239,978 | 12/1980 | Kofink . |
| 4,330,818 | 5/1982 | Peschel . |
| 4,471,423 | 9/1984 | Hase . |
| 4,667,282 | 5/1987 | Peterson . |
| 4,670,827 | 6/1987 | Schneider . |
| 4,706,179 | 11/1987 | Smith ..................... 363/126 |

*Primary Examiner*—Peter S. Wong
*Attorney, Agent, or Firm*—Richard V. Lang; Fred Jacob; Ernest F. Chapman

[57] ABSTRACT

The output terminals of a three-phase, wye-connected AC source, whose voltage varies over a wide dynamic range, are connected to a pair of DC voltage buses through a pair of oppositely poled, half-wave rectifier networks and a pair of switches. Taps uniformly positioned on the phase windings are brought out through another half-wave rectifier network directly to one bus, and the source neutral is connected directly to the other bus through a diode. A control circuit, operating in response to the DC voltage appearing across the buses, opens and closes the switches to selectively switch the rectifier networks and diode in and out so as to limit the DC voltage to a predetermined, compressed dynamic range.

19 Claims, 2 Drawing Sheets

RECTIFIER CIRCUIT PROVODING COMPRESSION OF THE DYNAMIC RANGE OF THE OUTPUT VOLTAGE

The present invention relates to power supplies for rectifying the output of an AC source and more specifically to a rectifier circuit controllably operating to limit the dynamic range of the DC output voltage derived from an AC source whose voltage varies over a wide dynamic range.

BACKGROUND OF THE INVENTION

In many applications, vehicular being a prime example, there is invariably a need for a regulated DC supply voltage to power small electrical motors, relays, electronic circuitry for control and instrumentation, etc. A source for this DC supply voltage is a permanent magnet alternator driven by the vehicle propulsion engine. The AC voltage generated by the alternator is then rectified and suitably filtered to derive the requisite DC supply voltage. Unfortunately, the permanent magnet alternator AC voltage is directly proportional to the speed at which it is driven by the vehicle engine. Alternator AC voltage dynamic ranges in excess of ten to one are not uncommon. Typical voltage regulators can not accommodate AC voltage dynamic ranges in excess of five to one, and multiple voltage regulators connected in cascade have been resorted to for wider dynamic ranges. This approach represents an additional expense, takes up valuable space, and adversely affects overall DC power supply reliability.

An example of an alternator having an exceptionally wide AC voltage dynamic range is a three-phase permanent magnet alternator which is widely used for control power in jet aircraft. The need for control over the full range of jet engine speeds can result in alternator AC voltages that range in excess of twenty to one. This widely varying AC voltage, once regulated to an acceptable DC voltage dynamic range, is typically applied to a switched mode type of power supply. One characteristic of a switched mode power supply is that it draws substantially constant power from the source regardless of the source voltage. Consequently, when the voltage is low, more current is drawn by the power supply to maintain a constant power input. However, due to the large series inductance of permanent magnet alternators, the AC voltage is further depressed by the higher current. Thus, when multiple regulators are used to handle AC voltage dynamic ranges exceeding the rating of a single regulator, the regulator circuit elements must be sized to accommodate these high currents. The additional power dissipation generates heat which reduces reliability and service life. On the other hand, the circuit elements must be capable of withstanding the extreme stresses imposed under high voltage conditions which are particularly acute while the DC power supply is lightly loaded.

In Applicant's commonly assigned U.S. Pat. No. 4,667,282, there is disclosed and claimed a rectifier circuit which addresses the foregoing problems. This rectifier circuit accepts an AC voltage varying over a wide dynamic range and produces a DC output voltage in which the dynamic range is compressed. This compression is achieved by monitoring the DC output voltage and automatically switching from full-wave rectification to half-wave rectification of the alternator AC voltage when a rising DC voltage reaches an upper threshold level and automatically switching from half-wave rectification to full-wave rectification when a falling DC voltage reaches a lower threshold level. The DC output voltage is thus limited to a compressed dynamic range defined by the upper and lower threshold levels as either a full-wave or a half-wave rectification of the AC source voltage.

It is accordingly an object of the present invention to provide an improved AC to DC rectifier circuit.

A further object is to provide a rectifier circuit for an AC source whose voltage varies over a wide dynamic range in which the dynamic range of the DC output voltage is compressed to a narrower dynamic range.

An additional object is to provide an AC to DC rectifier circuit providing compression of the dynamic range of the output voltage, which avoids the need for multiple stages in a subsequent voltage regulator.

Another object is to provide an AC to DC rectifier circuit providing compression of the dynamic range of the output voltage which avoids the stresses of extreme voltage and current conditions.

Yet another object is to provide an AC to DC rectifier circuit providing compression of the dynamic range of the output voltage, which is inexpensive to manufacture, efficient in operation, and reliable over a long service life.

Other objects of the invention will in part be obvious and in part appear hereinafter.

SUMMARY OF THE INVENTION

In accordance with the present invention, there is provided a rectifier circuit for converting an AC source voltage that varies over a wide dynamic range to a DC voltage that varies over a considerably smaller or compressed dynamic range.

The inventive regulator includes first and second oppositely poled rectifying networks whose inputs are connected to the output terminal ends of the plural (typically 2 or 3) phase windings of a widely varying AC voltage source and whose outputs are respectively connected through separate switches to a pair of DC voltage buses of opposite polarity. The neutral point of the AC source is brought out through a rectifier to one of the DC voltage buses. Taps on the phase windings of the AC source are brought out through a third rectifying network to the other DC voltage bus. A control circuit operates to condition the two switches to four different switch modes in response to variations in the DC output voltage across the two buses.

Of the four switch modes, a first provides for full-wave rectification of AC source full phase voltage, the second provides for half-wave rectification of the full phase voltage, the third provides for half-wave rectification of a greater portion of the phase voltage between the taps and the output terminal ends of the phase windings, and the fourth provides for half-wave rectification of a lesser portion of the phase voltage between the taps and the neutral point. The control circuit steps from one switch mode to the next in ascending order each time a rising DC output voltage reaches an upper threshold level and steps from one switch mode to the next in descending order each time a falling DC output voltage reaches the lower threshold level. The DC output voltage is thus efficiently limited to a highly compressed dynamic range defined by the upper and lower threshold levels in relation to the AC voltage dynamic range, The invention accordingly comprises the features of construction, combination of elements, and arrangement of parts, all of which will be set forth below, and the scope of the invention will be indicated in the claims.

For a full understanding of the nature and objects of the present invention, reference may be had to the following detailed description taken in conjunction with the accompanying drawings, in which.

Corresponding reference numerals refer to like parts throughout the several views of the drawing.

DETAILED DESCRIPTION OF THE INVENTION

Figure 1:
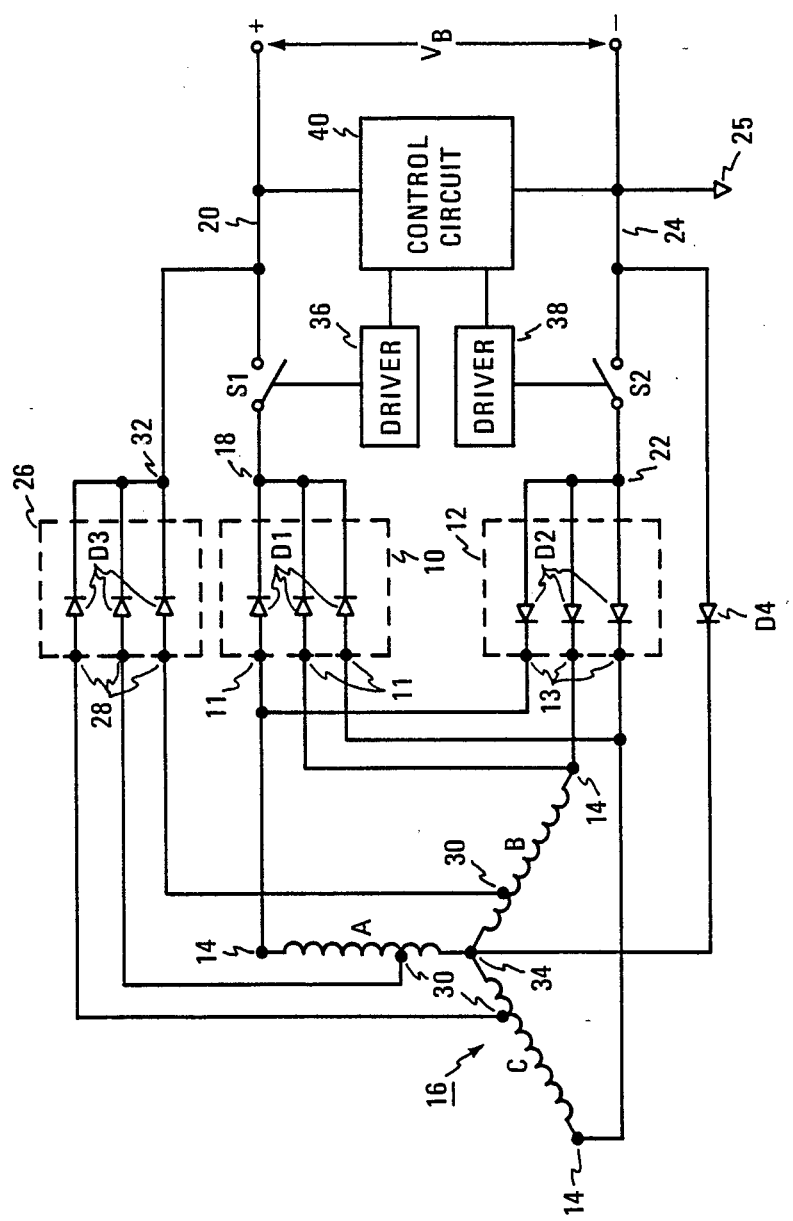
FIG. 1 is a circuit schematic diagram, partially block diagram form, of an AC to DC voltage regulator constructed in accordance with an embodiment of the present invention.

The AC to DC rectifier circuit of the present invention, as illustrated in FIG. 1, includes a first half-wave rectifier network 10 consisting of three diodes D1 commonly poled in one direction and a second half-wave rectifier network 12 consisting of three diodes D2 commonly poled in the opposite direction. The input terminals 11 of rectifier network 10, respectively common to the anodes of diodes D1, are respectively connected to the phase winding output terminals 14 of an AC voltage source 16, illustrated as a three-phase AC source such as a permanent magnet alternator. The input terminals 13 of rectifier network 12, respectively common to the cathodes of diodes D2, are respectively connected to the output terminals 14 of the three wye-connected phase windings A, B and C of source 16. The cathodes of diodes D1 are connected to a common network output terminal 18 which, in turn, is connectable through a switch S1 to a DC voltage bus 20 of a positive polarity, while the anodes of diodes D2 are connected to a common network output terminal 22 which, in turn, is connectable to a DC voltage bus 24 of relatively negative polarity through a switch S2. These switches preferably take the form of transistor switches such as disclosed in Applicant's above-noted U.S. Pat. No. 4,667,282, the disclosure of which is specifically incorporated herein by reference. It will be appreciated that these switches may be implemented in other forms, such as electromagnetic relays.

Still referring to FIG. 1, a third half-wave rectifier network 26, consisting of three diodes D3, has its input terminals 28 at the diode anodes respectively connected to phase winding taps 30. The cathodes of diodes D3, which are commonly poled in the same direction as diodes D1 of network 10, are connected in common at a network input terminal 32 which is, in turn, directly connected to DC bus 20. The neutral point 34 of the wye-connected phase windings A, B and C is brought out through a diode D4, poled in the same direction as the diodes D2 of network 12, to DC bus 24 which is tied to a suitable reference voltage, as indicated at 25. The corresponding locations of taps 30 on the respective phase windings are such that the AC voltages on the winding portions from the taps to neutral point 34 are different from the AC voltages on the winding portions from the taps to output terminals. In the illustrated embodiment, satisfactory DC voltage regulation is achieved with a tap 30 located on each phase winding one-third of the winding distance from the neutral point out to the output terminal. Thus, one-third of the total phase voltage on each winding appears from tap to neutral, while two-thirds of the total phase voltage appears from tap to output terminal.

Completing the description of the voltage regulator seen in FIG. 1, switches S1 and S2 are opened and closed, i.e., rendered non-conductive and conductive, by separate drivers 36 and 38, which may be of the construction disclosed in U.S. Pat. No. 4,667,282 if the switches are embodied as transistor switches. Controlling the two switch drivers is a control circuit 40 which is illustrated in greater detail in FIG. 2.

The arrangement provides four switch modes. From the description thus far, it is seen that, with both switches S1 and S2 closed, a DC output voltage $V_B$ is developed across buses 20 and 24 as a full-wave rectification of the full three-phase voltages appearing on phase windings A, B and C. This switch condition imposes a first switch mode wherein the average value of the DC output voltage $V_B$ is equal to approximately 2.33 times the RMS value of the full phase to neutral AC voltage. Under these circumstances, diodes D3 of network 26 and diode D4 are back-biased and thus effectively switched out of the regulator circuit. The first mode corresponds to the operating line 60 from the origin to $V_U$ in FIG. 3. A second switch mode is imposed by a switch condition wherein switch S1 is closed, and switch S2 is opened. This is seen to switch rectifier network 12 out of the circuit and to insert diode D4 in its place. Consequently, a half-wave rectification of the full phase to neutral AC voltages is achieved. The ratio of average DC output voltage to RMS value of the full phase to neutral AC voltage drops to approximately 1.17 to one. Again, diodes D3 of network 26 are back-biased and thus removed from the circuit. The second mode corresponds to the operating line 64 between $V_L$ and $V_U$ in FIG. 3.

As a third switch mode, switch S1 is opened, and switch S2 is closed. Rectifier network 10 is thus switched out of the circuit, and rectifier network 26 is switched in. This is seen to produce a half-wave rectification of the portions of the three phase voltages appearing between taps 30 and output terminals 14 of phase windings A, B and C. With taps 30 located one-third of the phase winding length from the neutral point, the ratio of average DC output voltage $V_B$ to the RMS value of the full phase to neutral AC voltage is now dropped to approximately 0.78 to one. The third mode corresponds to the operating line 68 between $V_L$ and $V_U$ in FIG. 3.

The fourth and final switch mode is achieved by opening both switches S1 and S2. Rectifier networks 10 and 12 are switched out, and rectifier network 26 and diode D4 are switched in. The DC output voltage $V_B$ is now produced from half-wave rectification of the fractions of the three phase voltages which appear on the portions of the phase windings between taps 30 and neutral point 34. The ratio of average DC output voltage to the RMS value of the full phase to neutral AC voltage is now reduced to approximately 0.39 to one. The fourth mode corresponds to the operating line 76 between $V_L$ and $V_U$ in FIG. 3.

From the foregoing description, it is seen that if control circuit 40 steps from one to the next switch mode in ascending order from the first to the fourth, each step results in approximately halving the ratio of the average DC output voltage $V_B$ to the RMS value of the full phase to neutral AC voltage. Conversely, stepping from one to the next switch modes in the opposite or descending order results in doubling the ratio the average of DC output voltage to RMS phase voltage with each step.

Figure 2:
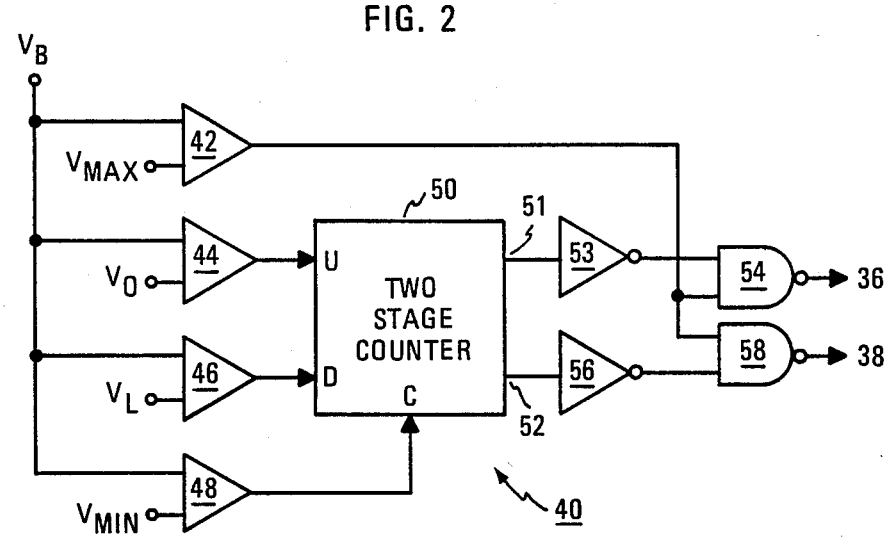
FIG. 2 is a logic diagram of the control circuit of FIG. 1.
Figure 3:
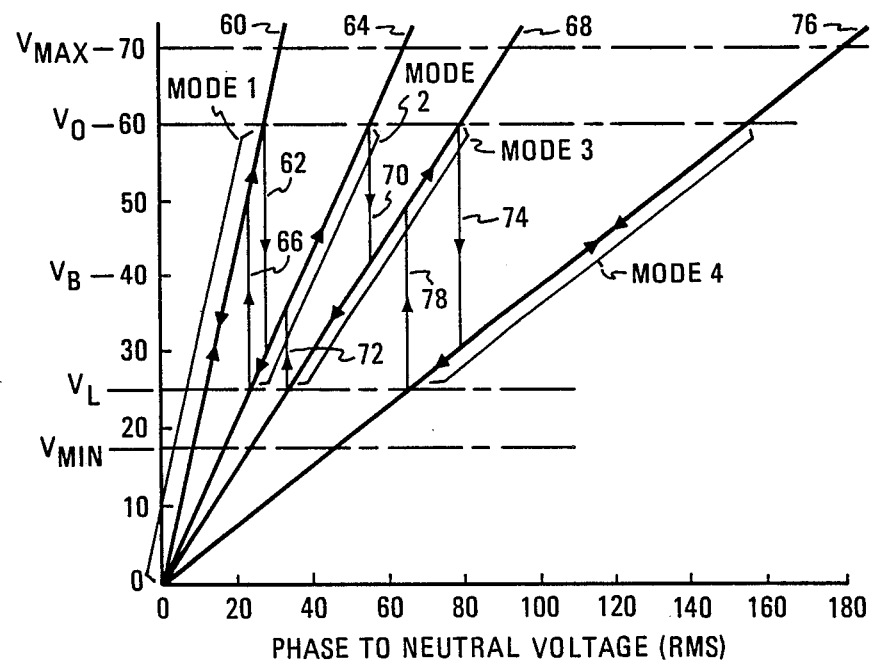
FIG. 3 is a graph illustrating the operation of the voltage regulator of FIG. 1.

Control circuit 40 is constructed in the manner illustrated in FIG. 2 to establish the four switch modes and to step from one to the next in ascending or descending order automatically in response to variations in DC output voltage $V_B$ As seen in FIG. 2, voltage $V_b$ is applied as one input to each of four comparators 42, 44, 46 and 48. The other inputs to each of these comparators are voltages $V_{Max}$, $V_U$, $V_L$, and $V_{Min}$ respectively. As seen in FIG. 3, $V_{Max}$ is a maximum DC output voltage threshold established at a value of 70 volts in the illustrated embodiment. $V_U$ is an upper DC output voltage threshold established at a value of 60 volts, while $V_L$ is a lower output voltage threshold established at 25 volts. As will be seen, upper threshold $V_U$ and lower threshold $V_L$ represent the limits of the dynamic range to which the DC output voltage $V_B$ is regulated by the regulator of FIG. 1. $V_{Min}$ is a minimum output voltage threshold of approximately 18 volts, which corresponds to a full-wave rectified phase voltage of approximately 8 volts generated by alternator 16 when driven at a minimum engine speed. It will be appreciated that, in practice, control circuit 40 will include suitable voltage scaling circuitry for developing signal level voltages proportional to DC output voltage $V_B$ and the various threshold voltages.

The output of comparator 44 is applied to the count up input U of a two-stage counter 50, and the output of comparator 46 is applied to the count down input D of the counter. One counter output 51 is inverted by an inverter 53 and applied as one input to a NAND gate 54, while the other counter output 52 is inverted by an inverter 56 and applied as one input to a NAND gate 58. The other input to each of these gates is taken from the output of comparator 42. The outputs of gates 54 and 58 re respectively connected to switch drivers 36 and 38 of FIG. 1. Completing the description of FIG. 2, the output of comparator 48 is connected to the clear input C of counter 50.

In operation, as alternator 16 is driven up to minimum speed and the DC output voltage $V_B$ rises toward the $V_{Min}$ threshold seen in FIG. 3, comparator 48 ensures that counter 50 is cleared to a "zero" count. Since the output voltage $V_B$ is below the $V_{Max}$ threshold, the output of comparator 42 is high or a logical "one", and NAND gates 54 and 58 are thus enabled. For a "zero" count, the counter outputs 51 and 52 are both low or logical "zeros" which are inverted to logical "ones" by inverters 53 and 56. The gate outputs are both low or logical "zeros", and drivers 36 and 38 are conditioned to render conductive or close their respective switches S1 and S2.

As described above in connection with FIG. 1, in this first switch mode, output voltage $V_B$ is obtained from the three-phase, full-wave rectification of the AC voltages on the full phase windings A, B and C from output terminal 14. Thus the relationship of average DC output voltage $V_B$ to RMS phase voltage is defined by the operating line 60 in FIG. 3.

As the alternator 16 speeds up, the DC output voltage $V_B$ increases along line 60 until threshold $V_U$ at 60 volts is reached. Comparator 44 signals this event by stepping counter up from a "zero" count to a "one" count. The counter output 52 goes to a logical "one", while counter output 51 remains at a logical "zero". The output of gate 54 remains a logical "zero" to sustain the conduction of switch S1, while the output of gate 58 goes to a logical "one" to render switch S2 non-conductive. In this second switch mode, rectifier network 12 is switched out, and the DC output voltage is now developed as a three-phase, half-wave rectification of the phase voltages. As seen in FIG. 3, voltage $V_B$ is cut substantially in half to 30 volts as it falls along transition line 62 to operating line 64. If voltage $V_B$ should then decrease along operating line 64 to the lower voltage threshold at 25 volts, comparator 46 will step counter down to "zero", and the first, full-wave rectification switch mode is re-established. The DC output voltage is thus substantially doubled from 25 to 50 volts along transition line 66 back to operation line 60.

On the other hand, if, upon stepping from the first switch mode to the second switch mode, the DC output voltage continues to ascent along operating line 64, the upper threshold $V_U$ is again reached. In response, comparator 44 steps counter 50 up to a "two" count. Counter outputs 51 and 52 then assume a logical "one" and a logical "zero", respectively. The gate 54 output goes to a "one" and a logical "zero", respectively. The gate 54 output goes to a "one" to open switch S1 via driver 36, and the gate 58 output goes to a "zero" to close switch S2 via driver 38. This is seen to establish a third switch mode in ascending order, wherein rectifier network 10 is switched out, and rectifier network 26 is switched in. The DC output voltage $V_B$ is now obtained from the three-phase, half-wave rectification of the voltages appearing on the phase windings between their output terminals 14 and taps 30. The voltage $V_B$ thus drops to operating line 68 along transition line 70 from 60 volts to approximately 40 volts. If the output voltage then drops along operating line 68 to the lower threshold $V_L$, comparator 46 steps counter 50 down to a "one" count, and the second switch mode is re-established. The voltage $V_B$ then jumps up from 25 to approximately 36 volts along transition line 72 back to operating line 64.

However, if the output voltage continues to rise along operating line 68 to again reach upper threshold $V_U$, comparator 44 steps counter 50 up to a "three" count. This establishes a fourth switch mode in ascending order by causing both gate outputs to assume logical "ones" and thus open both switches S1 and S2. This switches out rectifier networks 10 and 12, leaving the output voltage $V_B$ to be developed from three-phase, half-wave rectification of the phase voltages appearing in the portions of the phase windings between their taps 30 and neutral point 34. The DC output voltage thus drops from 60 volts to 30 volts along transition line 74 to operating line 76. If the output voltage falls along this operating line down to lower threshold $V_L$, comparator 46 steps counter 50 back down to a "two" count which establishes the third switch mode. As a result, voltage $V_B$ jumps from 25 to 50 volts along transition line 78 back up to operating line 68.

From the foregoing description, it is seen that the voltage regulator of the present invention steps through the first, second, third and fourth switch modes in ascending order to regulate a rising DC output voltage $V_B$ to the upper limit of a dynamic range defined by threshold $V_U$ and steps through these switch modes in descending order to regulate a falling DC output voltage to the lower limit of a dynamic range defined by threshold $V_L$. Variations of the output voltage $V_B$, regardless of which one of the four switch modes is in effect, are thus effectively limited to this dynamic range. It is important to note that, to avoid any operating ambiguity, the width of this dynamic range must exceed the largest change in output voltage occasioned by a step from any one switch mode to the next in either ascending or descending order. From FIG. 3, it is seen that the regulated dynamic range is approximately 35 volts, whereas the largest voltage change represented by the various transition lines is approximately 30 volts, e.g., transition lines 62 and 74. It is seen that if the magnitude of any voltage change or transition occasioned by a switch mode step were to exceed the dynamic range set by the $V_U$ and $V_L$ threshold, the voltage regulator would toggle up and down between adjacent switch modes.

The $V_{Max}$ and $V_{Min}$ thresholds are provided to prevent a runaway condition should any of the switch mode step points be missed. If comparator 44 fails to respond to voltage $V_B$ reaching threshold $V_U$ while operating on any of the lines 60, 64 or 68, and the output voltage reaches the $V_{Max}$ threshold, comparator 42 switches to a logical "zero". The gate outputs then assume logical "one" regardless of the count in counter 50. This imposes the fourth switch mode with both switches S1 and S2 open, and the voltage $V_B$ drops to operating line 76. If a switch mode step point is missed by comparator 46, and voltage $V_B$ falls to the $V_{Min}$ threshold while operating on lines 64, 68 or 76, comparator 48 clears the counter to "zero". The gate outputs go to logical "zero" imposing the first switch mode with both switches closed, and the DC output voltage $V_B$ jumps to operating line 60.

While the illustrated embodiment of the invention is implemented with a three-phase AC source, it will be readily apparent that a single phase AC source could be utilized. Such a source may take the form of single phase voltage winding with a center tap brought out as a neutral point for connection through a diode to a negative DC voltage bus. The output terminals at the winding ends would be brought out through oppositely poled, half-wave rectifier networks equivalent to networks 10 and 12 in FIG. 1 for connections to the positive and negative voltage buses by separate switches. Taps on the winding sections to each side of the center tap would be brought out through a rectifier network equivalent to network 26 to the positive voltage bus. Stepping between the four available switch modes to regulate the DC output voltage to a defined, compressed dynamic range would be effected automatically by a control circuit configured in accordance with the teachings of FIGS. 2 and 3 and the foregoing description.

It should be noted that the inclusion of inverters 53 and 56 in FIG. 2 is made to simplify the explanation of the operating logic for NAND gates 54 and 58. In practice, inverted counter outputs may simply be taken from available complementing output terminals of a typical two-stage counter. Furthermore, it will be appreciated that winding taps 30 could be located on each phase winding one-third of the winding length in from their output terminals. In this case, the described third and fourth switch modes would simply be imposed in reverse order for rising and falling DC output voltage conditions.

In view of the foregoing, it is seen that the objects set forth above, including those made apparent from the Detailed Description, are efficiently attained, and, since certain changes may be made in the illustrated embodiment without departing from the invention, it is intended that matters of detail be taken as illustrative and not in limiting sense.

Having described the invention, what is claimed as new and desired to be secured by Letter Patent is:

1. A rectifier circuit comprising, in combination:
   A. an AC source subject to variation in voltage over a large dynamic range, said source including
      (1) a winding in which a voltage is induced having at least first and second winding sections with corresponding one ends thereof commonly connected to a neutral point and corresponding other ends thereof respectively connected to separate AC output terminals; and
      (2) each said first and second winding sections having a tap at a location uniformly spaced from said neutral point;
   B. first and second DC voltage buses;
   C. first rectifier means poled in a first direction and having input terminals respectively connected between said AC output terminals and a first DC terminal;
   D. second rectifier means poled in a second direction opposite said first direction and having input terminals respectively connected between said AC output terminals and a second DC terminal;
   E. a first switch connecting said first DC terminal to said first DC bus;
   F. a second switch connecting said second DC terminal to said second DC bus;
   G. third rectifier means poled in said first direction and having input terminals respectively connected between said taps and said first DC bus;
   H. fourth rectifier means poled in said second direction and connecting said neutral point to said second DC bus; and
   I. a control circuit operating in response to the DC output voltage across said first and second DC buses for selectively opening and closing said first and second switches such as to limit the DC output voltage to a dynamic range smaller than the dynamic voltage range of said AC source.

2. The rectifier circuit defined in claim 1, wherein said control circuit is structured for effecting
   (1) a first switch mode wherein both said first and second switches are closed to provide said DC output voltage as a full-wave rectification of the AC voltages appearing on said first and second winding sections at said AC output terminals thereof,
   (2) a second switch mode wherein said first switch is closed and said second switch is open to provide said DC output voltage as a half-wave rectification of the AC voltages appearing on said first and second winding sections between said neutral point and said AC output terminals thereof,
   (3) a third switch mode wherein said first switch is open and said second switch is closed to provide said DC output voltage as a half-wave rectification of the AC voltages appearing on said first and second winding sections between said taps and said AC output terminals thereof, and
   (4) a fourth switch mode wherein both said first and second switches are open to provide said DC output voltage as a half-wave rectification of the AC voltages appearing on said first and second winding sections between said taps and said neutral point.

3. The rectifier circuit defined in claim 2, wherein said control circuit further is structured to step between successive switch modes from said first to said second to said third to said fourth switch modes in ascending order in response to a rising DC output voltage and to step between said successive switch modes in descending order in response to a falling DC output voltage.

4. The rectifier circuit define in claim 3, wherein said control circuit includes first means for establishing an upper DC voltage threshold and second means for establishing a lower DC voltage threshold, said first means initiating a step from one of said switch modes to the next said switch mode in ascending order each time a rising DC output voltage reaches said upper voltage threshold, and said second means initiates a step from one of said switch modes to the next said switch mode in descending order each time a falling DC output voltage reaches said lower voltage threshold.

5. The rectifier circuit defined in claim 4, wherein the difference between said upper and lower voltage thresholds of the control circuit limits the maximum change in said DC output voltage before stepping to another switch mode.

6. The rectifier circuit defined in claim 5, wherein said control circuit further includes a counter responsive to said first means for changing its content one count in one direction each time said DC output voltage reaches said upper DC voltage threshold and responsive to said second means for changing its said content one count in a direction opposite said one direction each time said DC output voltage reaches said lower DC voltage threshold, and gating means responsive to said counter content for selectively effecting said first, second, third and fourth switch modes.

7. The rectifier circuit defined in claim 6, wherein said control circuit further includes third means for establishing a maximum DC voltage threshold above said upper DC voltage threshold and fourth means for establishing a minimum DC voltage threshold below said lower DC voltage threshold, said third means effecting said fourth switch mode in the event said DC output voltage rises to said maximum DC threshold voltage, and said fourth means effecting said first switch mode in the event said DC output voltage falls to said minimum DC voltage threshold.

8. The rectifier circuit defined in claim 7, wherein said third means conditions said gating means to effect said fourth switch mode regardless of said counter content in the event said DC output voltage rises to said maximum DC voltage threshold, and said fourth means zeros said counter content to effect said first switch mode in the event said DC output voltage falls to said minimum DC voltage threshold.

9. The rectifier circuit define in claim 8, wherein said AC source is a three-phase source having first, second and third winding sections connected to wye configuration to said neutral point and each having a separate said tap at a uniformly spaced location from said neutral point.

10. The rectifier circuit defined in claim 9, wherein each said tap is located in each said winding section relative to said neutral point at a point approximately one-third of the length of said winding section extending from said neutral point to said AC output terminal thereof.

11. A polyphase rectifier circuit comprising, in combination:

A. a polyphase AC source subject to variation in voltage over a large dynamic range, said source including
 (1) three phase windings in which a voltage is induced having corresponding one ends thereof commonly connected to a neutral point and corresponding other ends thereof respectively connected to separate AC output terminals; and
 (2) each said phase winding having a tap at location uniformly spaced from said neutral point;
B. first and second DC voltage buses;
C. a first set of three half-wave rectifiers poled in a first direction and having separate input terminals respectively connected between said AC output terminals and a first common DC terminal;
D. a second set of three half-wave rectifiers poled in a second direction opposite said first direction and having separate input terminals respectively connected between said AC output terminals and a second common DC terminal;
E. a first switch connecting said first DC terminal to said first DC bus;
F. a second switch connecting said second DC terminal to said second DC bus;
G. a third set of three half-wave rectifiers poled in said first direction and having separate input terminals respectively connected between said taps and said first DC bus;
H. a fourth half-wave rectifier poled in said second direction and connecting said neutral point to said second DC bus; and
I. a control circuit operating in response to the DC voltage across said first and second DC buses for selectively opening and closing said first and second switches such as to limit the DC output voltage to a dynamic range smaller than the dynamic voltage range of said AC source.

12. The polyphase rectifier circuit defined in claim 11, wherein said control circuit is structured for effecting
 (1) a first switch mode wherein both said first and second switches are closed to provide said DC output voltage as a full-wave rectification of the AC voltages appearing on said windings at said AC output terminals thereof,
 (2) a second switch mode wherein said first switch is closed and said second switch is open to provide said DC output voltage as a half-wave rectification of the AC voltage appearing on said windings between said neutral point and said AC output terminals thereof,
 (3) a third switch mode wherein said first switch is open and said second switch is closed to provide said DC output voltage as a half-wave rectification of the AC voltages appearing on said windings between said taps and said AC output terminals thereof, and
 (4) a fourth switch mode wherein both said first and second switches are open to provide said DC output voltage as a half-wave rectification of the AC voltages appearing on said windings between said taps and said neutral point.

13. The polyphase rectifier circuit defined in claim 12, wherein said control further is structured to step between successive switch modes in an ascending order in response to a rising DC output voltage and to step between said successive switch modes in a descending order in response to a falling DC output voltage.

14. The polyphase rectifier circuit defined in claim 13, wherein said control circuit includes first means for establishing an upper DC voltage threshold and second means for establishing a lower DC voltage threshold, said first means initiating a step from one of said switch modes to the next said switch mode in ascending order each time a rising DC output voltage reaches said upper voltage threshold, and said second means initiates a step from one of said switch modes to the next said switch mode in descending order each time a falling DC output voltage reaches said lower voltage threshold.

15. The polyphase rectifier circuit defined in claim 14, wherein the difference between said upper and lower voltage thresholds of the control circuit limits the maximum change in said DC output voltage before stepping to another switch mode.

16. The polyphase rectifier circuit defined in claim 15, wherein said control circuit further includes a counter responsive to said first means for changing its content one count in one direction each time said DC output voltage reaches said upper DC voltage threshold and responsive to said second means for changing its said content one count in a direction opposite said one direction each time said DC output voltage reaches said lower DC voltage threshold, and gating means responsive to said counter content for selectively effecting said first, second, third and fourth switch modes.

17. The polyphase rectifier circuit defined in claim 16, wherein said control circuit further includes third means for establishing a maximum DC voltage threshold above said upper DC voltage threshold and fourth means for establishing a minimum DC voltage threshold below said lower DC voltage threshold, said third means effecting said fourth switch mode in the event said DC output voltage rises to said maximum DC threshold voltage, and said fourth means effecting said first switch mode in the event said DC output voltage falls to said minimum DC voltage threshold.

18. The polyphase rectifier circuit defined in claim 17, wherein said third means conditions said gating means to effect said fourth switch mode regardless of said counter content in the event said DC output voltage rises to said maximum DC voltage threshold, and said fourth means zeros said counter content to effect said first switch mode in the event said DC output voltage falls to said minimum DC voltage threshold.

19. The polyphase rectifier circuit defined in claim 15, wherein each said tap is located in each said winding relative to said neutral point at a point approximately one-third of the length of said winding section extending from said neutral point to said AC output terminal thereof.

* * * * *